Figure 1:
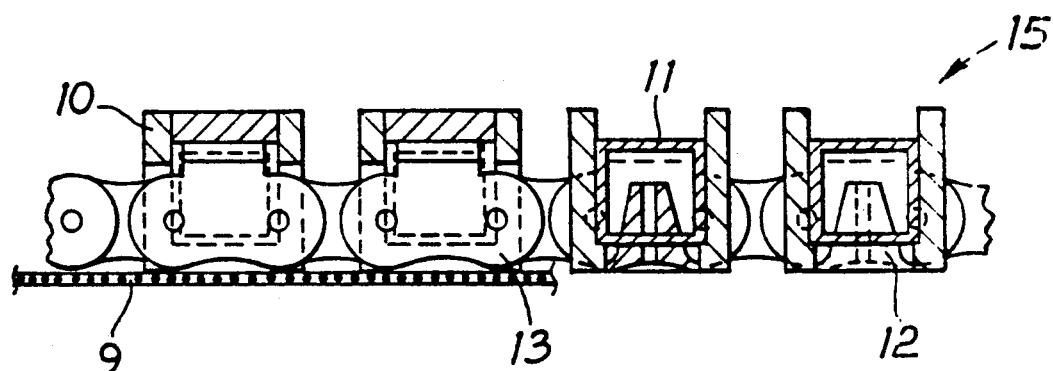

United States Patent [19]
Goodfellow

[11] Patent Number: 5,261,994
[45] Date of Patent: Nov. 16, 1993

[54] FLEXIBLE CARRIER FOR TRANSPORTING FLEXIBLE SHEET MATERIAL BETWEEN WORK STATIONS

[75] Inventor: Anthony G. Goodfellow, Maghull, United Kingdom

[73] Assignee: Bridgestone/Firestone Inc., Akron, Ohio

[21] Appl. No.: 22,429

[22] Filed: Feb. 16, 1993

Related U.S. Application Data

[63] Continuation of Ser. No. 566,395, Aug. 22, 1990, filed as PCT/GB89/00258, Mar. 13, 1989, abandoned.

[30] Foreign Application Priority Data

Mar. 12, 1988 [GB] United Kingdom ............... 8805922

[51] Int. Cl.⁵ .............................................. B29C 31/00
[52] U.S. Cl. .................................. 156/396; 156/405.1; 269/8; 269/21; 271/225
[58] Field of Search ............... 156/405.1, 406.2, 406.4, 156/447, 558, 566, 512, 264, 229, 174, 111, 123, 130, 130.7, 133, 134, 135, 540; 271/184, 185, 225; 198/803.01, 803.2, 465.2, 688.1, 689.1, 690.1, 698, 699, 699.1; 269/8, 21, 45, 311, 312, 901; 152/171, 172, 185.1, 187, 221, 222

[56] References Cited

U.S. PATENT DOCUMENTS

| | | | |
|---|---|---|---|
| 1,399,179 | 12/1921 | Angelo | 152/171 |
| 1,532,425 | 4/1925 | Markwick | 152/171 |
| 1,638,267 | 8/1927 | Morehead | 198/698 |
| 3,057,397 | 10/1962 | Riddle et al. | 156/405.1 |
| 3,236,711 | 2/1966 | Adler | 156/174 |
| 3,628,654 | 12/1971 | Haracz | 198/689.1 |
| 4,381,596 | 5/1983 | Simonton et al. | 271/94 |
| 4,398,988 | 8/1983 | Mullender | 156/405.1 |
| 4,783,230 | 11/1988 | Perkins | 156/117 |
| 4,877,468 | 10/1989 | Siegenthaler | 156/111 |

FOREIGN PATENT DOCUMENTS

| | | |
|---|---|---|
| 93345 | 5/1984 | Japan . |
| 447995 | 3/1968 | Switzerland . |
| 982033 | 2/1965 | United Kingdom . |

*Primary Examiner*—Geoffrey L. Knable
*Attorney, Agent, or Firm*—Sughrue, Mion, Zinn, Macpeak & Seas

[57] ABSTRACT

Handling means for the transportation of flexible sheet material comprises two work stations and a carrier (15) movable between the two work stations. The carrier is provided with means (12, 13) securely to support flexible sheet material (9) during its transport by the carrier between two work stations. The carrier preferably is flexible in a first direction whereby it may be deformed to follow a curved path (26) around a mandrel (25) at one work station. The carrier is thereby suited to receiving reinforced sheet material from a first mandrel (14) and applying it transposed, say through 90 degrees, around a second mandrel (25).

23 Claims, 8 Drawing Sheets

FLEXIBLE CARRIER FOR TRANSPORTING FLEXIBLE SHEET MATERIAL BETWEEN WORK STATIONS

This is a continuation of application Ser. No. 07/566,395 filed Aug. 22, 1990, filed as PCT/GB89/00258, Mar. 13, 1989, now abandoned.

This invention relates to handling means, and in particular although not exclusively to handling means in the form of a carrier for accurate location and retention of flexible reinforced or unreinforced sheet material and transportation of that material between two work stations.

In the manufacture of elastomeric articles the quality of the finished products commonly is related to the care and accuracy with which constituent components of the article, and especially any layers of reinforcement components, are handled and assembled relative to other components for further processing such as deformation, moulding and vulcanisation operations.

The present invention seeks to provide improved means for the accurate and reliable transportation of flexible sheet material between two work stations.

In accordance with one of its aspects the present invention provides handling means for the transportation of flexible sheet material comprising;

a first work station, a flexible carrier for receiving flexible sheet material at the first work station and incorporating retention means movable with the carrier said retention means being selectively operable to secure flexible sheet material to the carrier and accurately maintain a prescribed positioning of the sheet material relative to the carrier notwithstanding flexing movement of the carrier, a second work station for receiving flexible sheet material from the flexible carrier, drive means operable to move the flexible carrier between the first and second work stations, first alignment means to facilitate accurate location of flexible sheet material in a prescribed position on the carrier at the first work station, second alignment means to facilitate accurate location of sheet material relative to the second work station during transfer of the sheet material from the flexible carrier at the second work station, and carrier guide means to guide the carrier during movement thereof by the drive means between said first and second work stations whereby the direction relative to the carrier in which sheet material is received by the carrier from the first work station is substantially perpendicular to the direction relative to the carrier in which sheet material is transferred from the carrier to the second work station.

In accordance with another of its aspects the present invention provides handling means for the transportation of flexible sheet material comprising;

a first work station, a carrier for receiving flexible sheet material at the first work station and incorporating retention means movable with the carrier said retention means being selectively operable to secure flexible sheet material to the carrier and accurately maintain a prescribed positioning of the sheet material relative to the carrier during movement of the carrier, a second work station for receiving flexible sheet material from the carrier, drive means operable to move the carrier between the first and second work stations, first alignment means to facilitate accurate location of flexible sheet material in a prescribed position on the carrier at the first work station, and second alignment means to facilitate accurate location of the sheet material relative to the second work station during transfer of the sheet material from the carrier at the second work station.

The carrier of the preceding paragraph may be a flexible carrier.

In accordance with yet another of its aspects the present invention provides handling means for the transportation and positioning of flexible sheet material comprising;

a flexible carrier to support and move said flexible sheet material and incorporating retention means movable with the carrier, said retention means being selectively operable to secure flexible sheet material to the carrier and accurately maintain a prescribed relative positioning of the sheet material and carrier during movement of the carrier and alignment means associated with the carrier to facilitate accurate location of flexible sheet material in a prescribed position on the carrier at a first work station and accurate transfer and location of the sheet material relative to a second work station.

The carrier may be comprised by an array of slats, for example an array of a plurality of substantially rigid slats arranged in a side-by-side manner and interconnected by flexible connecting means whereby when arranged in a planar form the carrier is flexible about one axis contained by the plane of the carrier and substantially rigid about a second axis contained by said plane and extending substantially perpendicular relative to said one axis. The flexible connecting means may be a chain and preferably is a chain of the kind used in bicycle and similar transmissions, which is fully flexible in one plane but has only limited flexibility, if any, in a plane perpendicular to said one plane. Preferably the chain comprises a series of links interconnected by pins which freely interconnect respective pairs of links whereby the neighbouring slats may be moved to a small extent toward and away from one another. The carrier may comprise connecting means which confer a varying extensibility to different regions of the carrier. Thus if the carrier is flexible to a tubular form it may be arranged that when in the tubular form the carrier may be caused to adopt a barrel or like shape in contrast to a true cylindrical form.

The carrier alternatively may comprise a layer of flexible material such as flexible reticulated foam or a plurality of blocks arranged in a two dimensional array and interconnected by connecting means such as chain links in each of two mutually perpendicular directions of the array. The carrier may comprise an interlinked array of support blocks the interconnecting links of which are arranged to facilitate flexing of the carrier to either a substantially cylindrical or like tubular form in which two end portions of the carrier are brought into proximity one with the other. Alternatively the carrier may comprise an interlinked array of support blocks the interconnecting links of which are arranged to facilitate flexing of the carrier in a helical manner to a scroll-like form.

The retention means may comprise a vacuum means. In constructions in which the carrier is of a slatted construction one or more of the slats may each be provided with a vacuum manifold arranged in communication with a plurality of suction zones in a surface of the slat intended in normal use to serve as a support for flexible sheet material. One or more slats additionally or alternatively may comprise a pressure manifold for supply of pressurised fluid to at least one opening in that surface of the slat for support of flexible sheet material whereby a supply of pressurised fluid to said pressure manifold will urge flexible sheet material away from the support surface of the slat.

At least one of the two end slats of the carrier may comprise said pressure manifold.

Additional, or as an alternative, to vacuum retention means, magnetic-type retention means may be provided especially where the flexible sheet material to be transported by the handling means comprises ferrous material.

For retention of an edge region of sheet material to be carried by the carrier said carrier may comprise or have associated therewith clamp means operable physically to clamp an edge of sheet material relative to the carrier at least until vacuum or other retention means comes into operation. The clamp means may be provided on a carriage on which the carrier is slideably mounted. Preferably the carriage is operable to move the carrier in unison therewith in a direction perpendicular to the direction in which the carrier may slide relative to the carriage.

When the carrier is of the slatted type at least one of the two end slats may be individually rotatable relative to slats lying intermediate said end slats thereby to facilitate interconnection of the end slats one with the other when the carrier is flexed to a generally tubular form.

The carrier may be provided at at least one edge region with edge support means for support of material applied around the carrier when in a deformed and substantially tubular condition. Said edge support means may comprise a support face which extends substantially perpendicular to the support surface of the carrier.

The handling means may comprise a first work station at which flexible sheet material may be formed, provided or stored in substantially tubular form prior to transfer to the carrier. The first work station may be in the form of a mandrel around which may be formed a tubular layer of elastomeric or like material having at least partially embedded therein at least one helically extending reinforcement element such as a cord or yarn of metallic or textile material. The first work station may comprise cutting means for cutting the tubular layer transversely, for example in a substantially longitudinal direction.

Guide means may be provided to guide the carrier between the first work station and a second work station whereby the direction relative to the carrier in which sheet material is transferred from the carrier to the second work station is substantially parallel with the length of a cut edge of sheet material when supported on the carrier.

The handling means may comprise a second work station at which flexible sheet material supported by the carrier may be caused to adopt a substantially tubular form, for example around an expansible former. In the case of a flexible carrier, connecting means may be provided to interlock ends of the flexible carrier at the second work station whereby the carrier may resist forces arising upon expansion of the former. The second work station alternatively may comprise a former of a non-expansible or non-contractible kind. The former, whether expansible or not, may comprise holding means such as a holding finger for retention of flexible sheet material.

Figure 2:
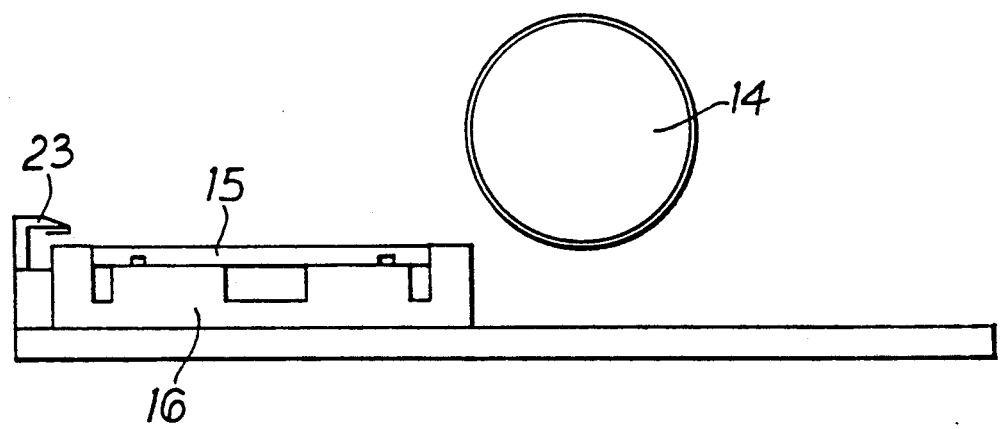
Figure 3:
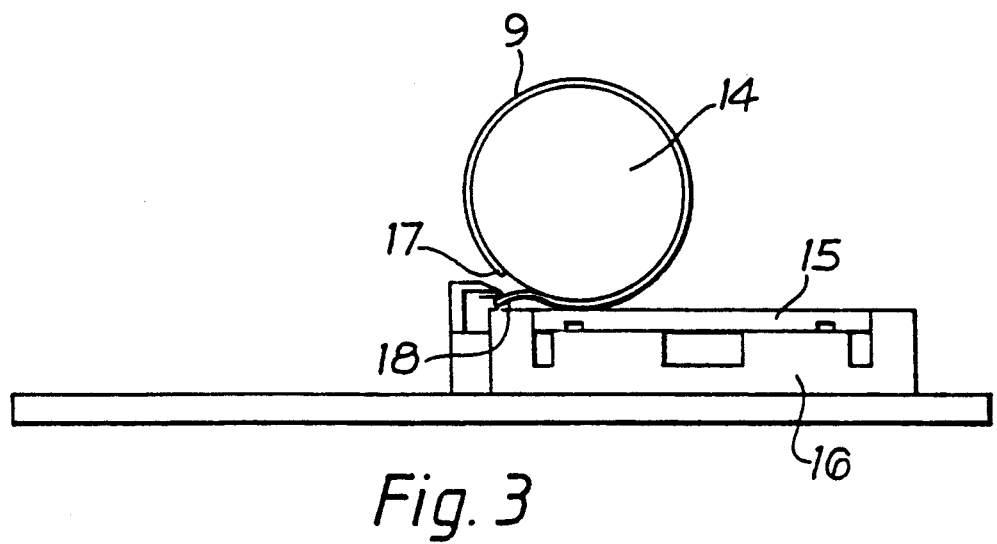
Figure 4:
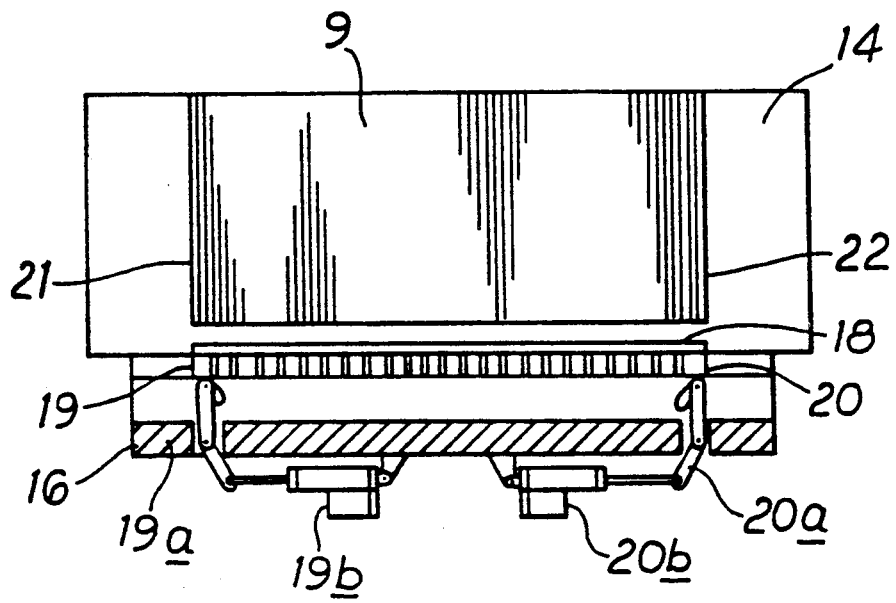
Figure 7:
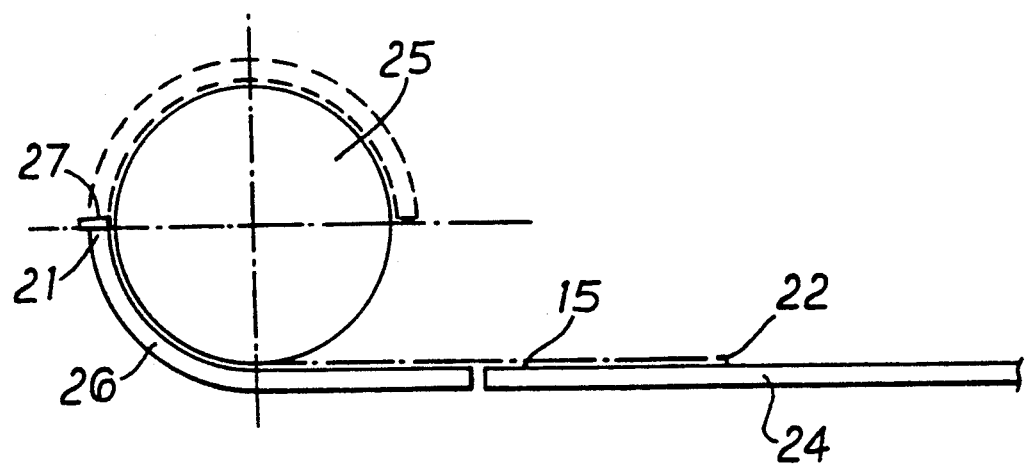
Figure 8:
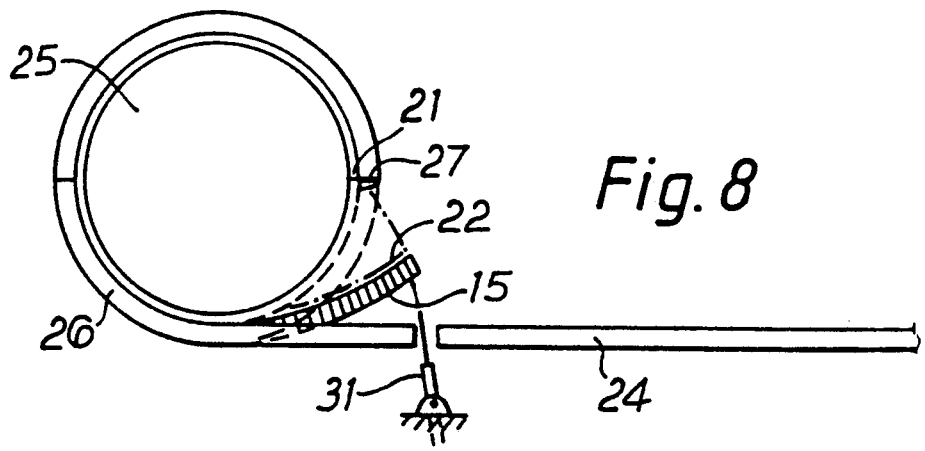
Figure 9:
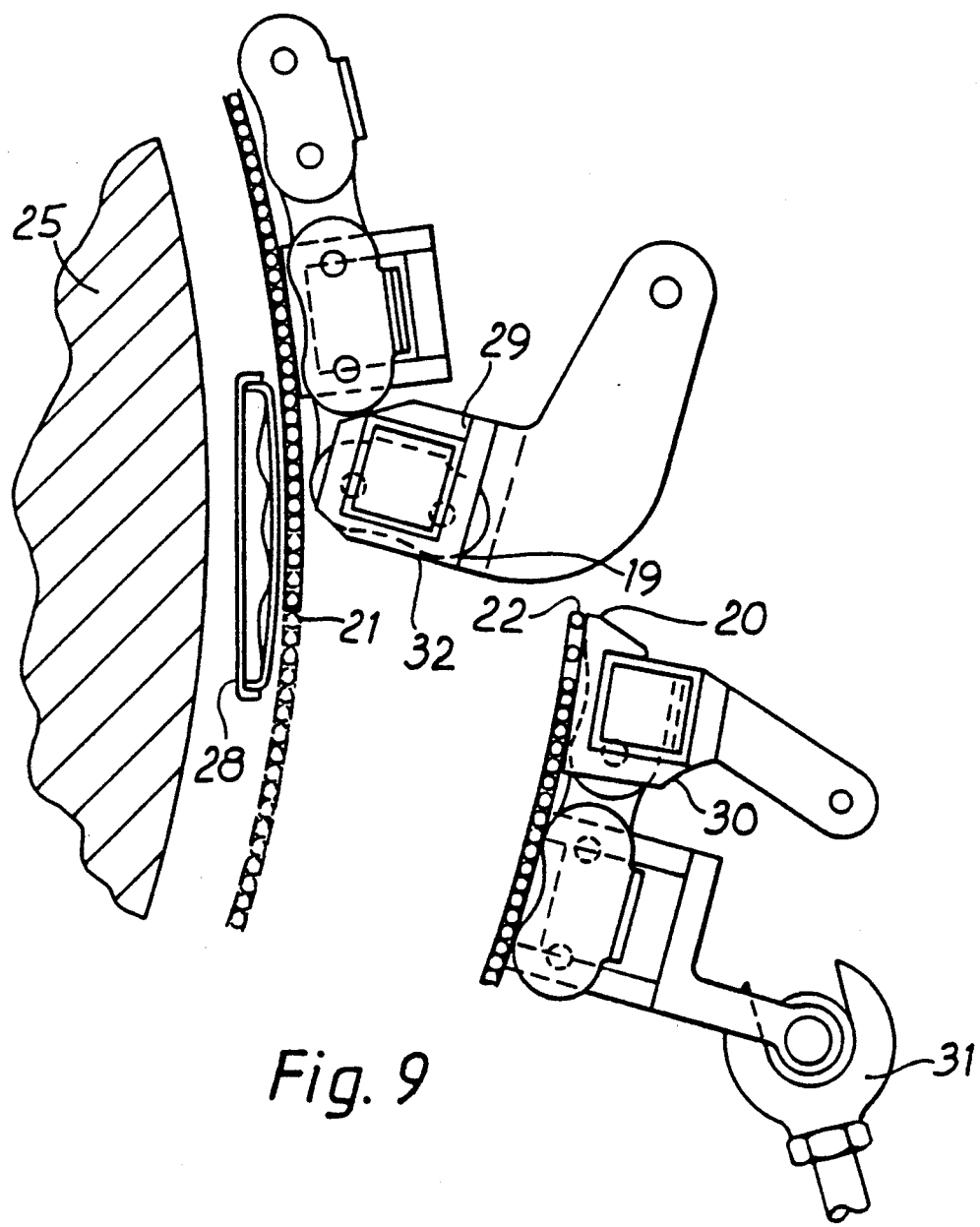
Figure 10:
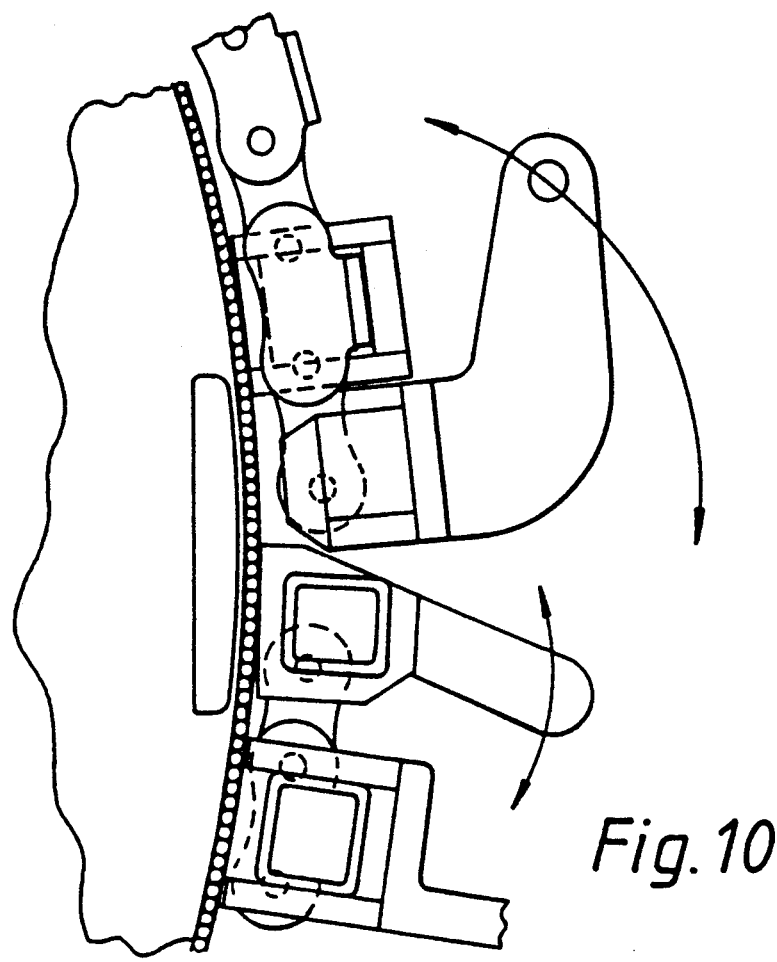
Figure 11:
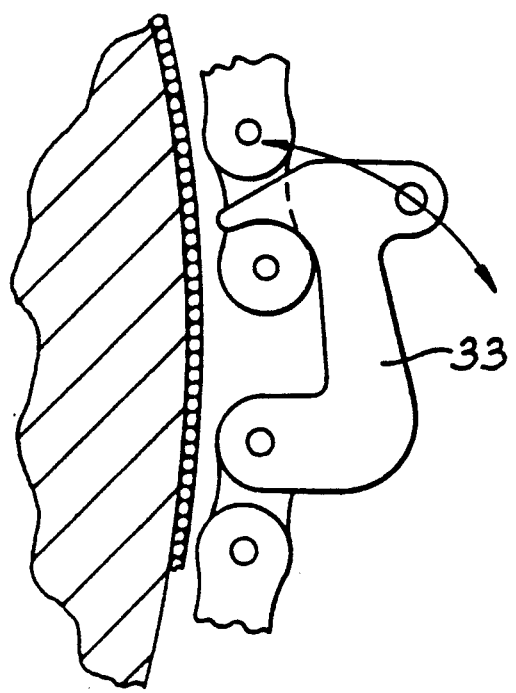
Figure 12:
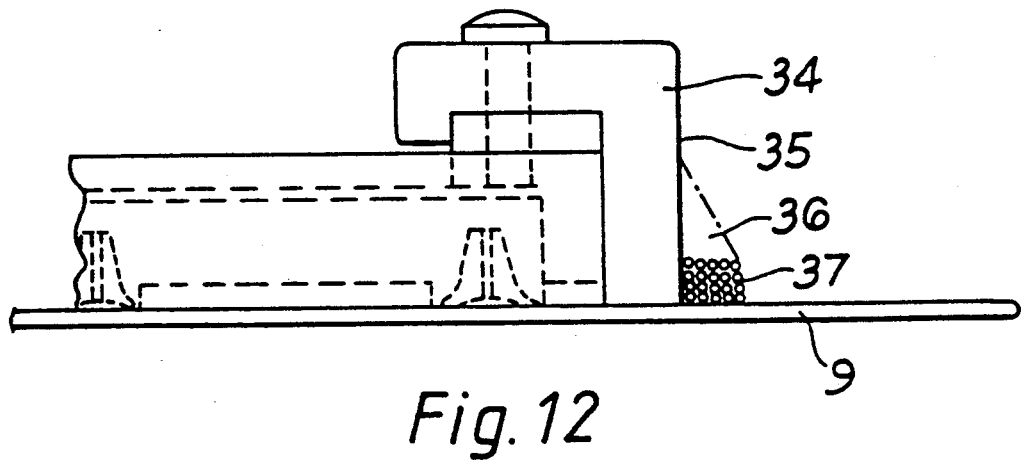
Figure 13:
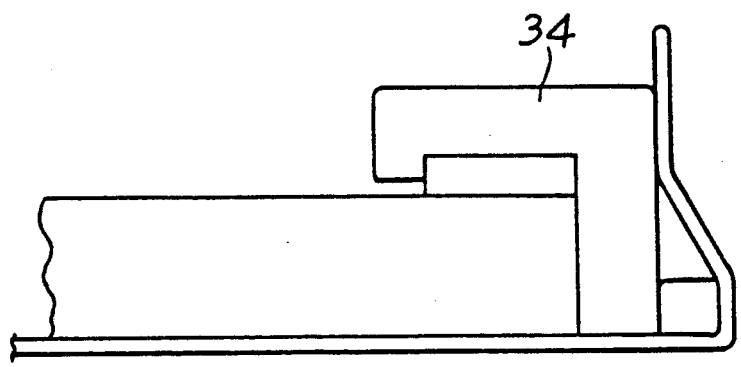
Figure 14:
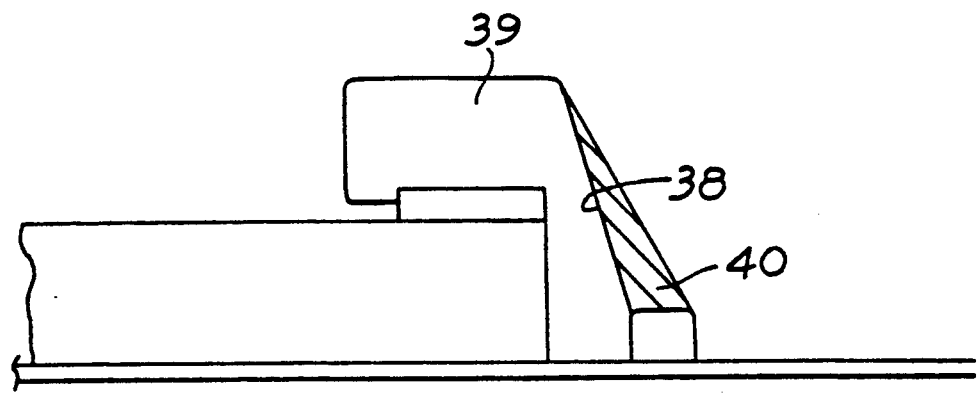
Figure 15:
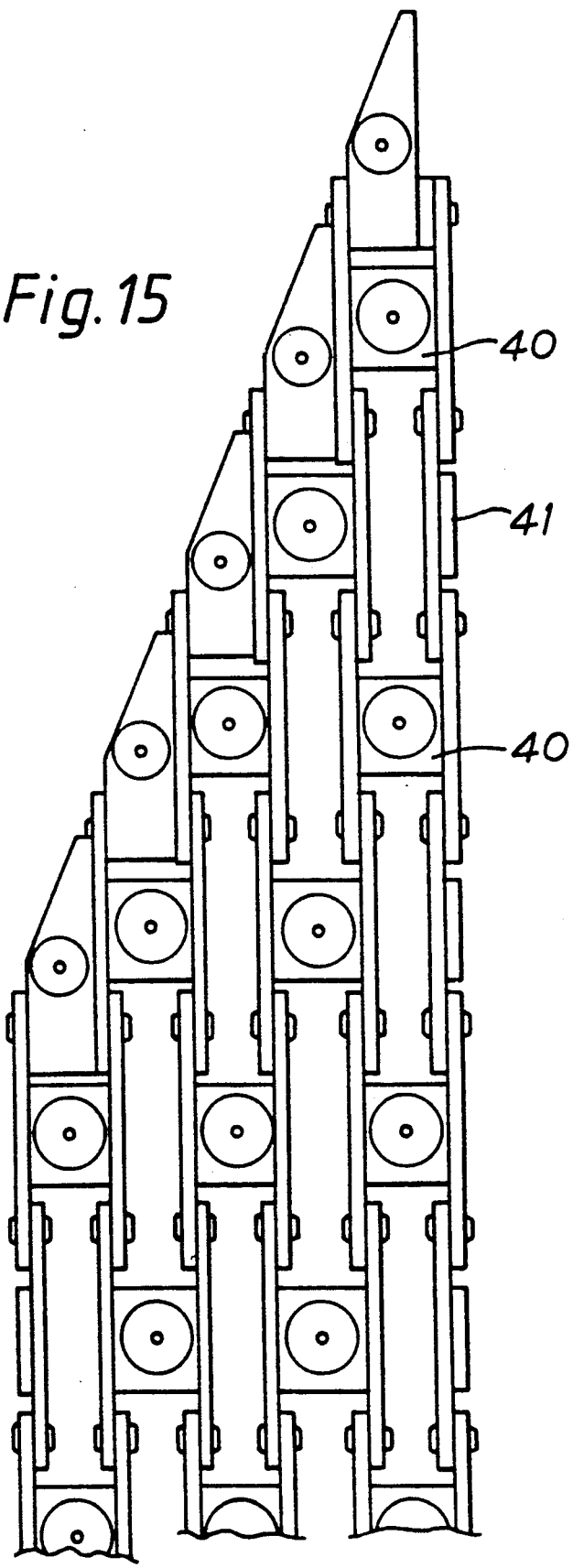
Figure 16A:
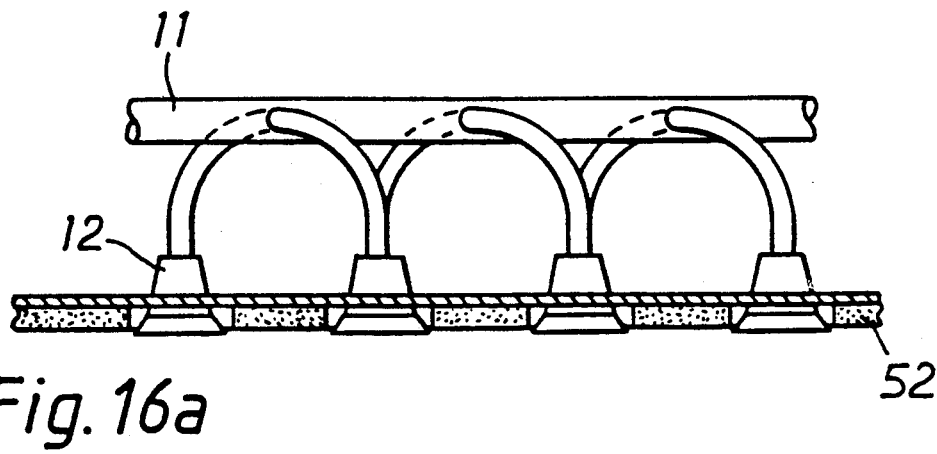
Figure 16B:
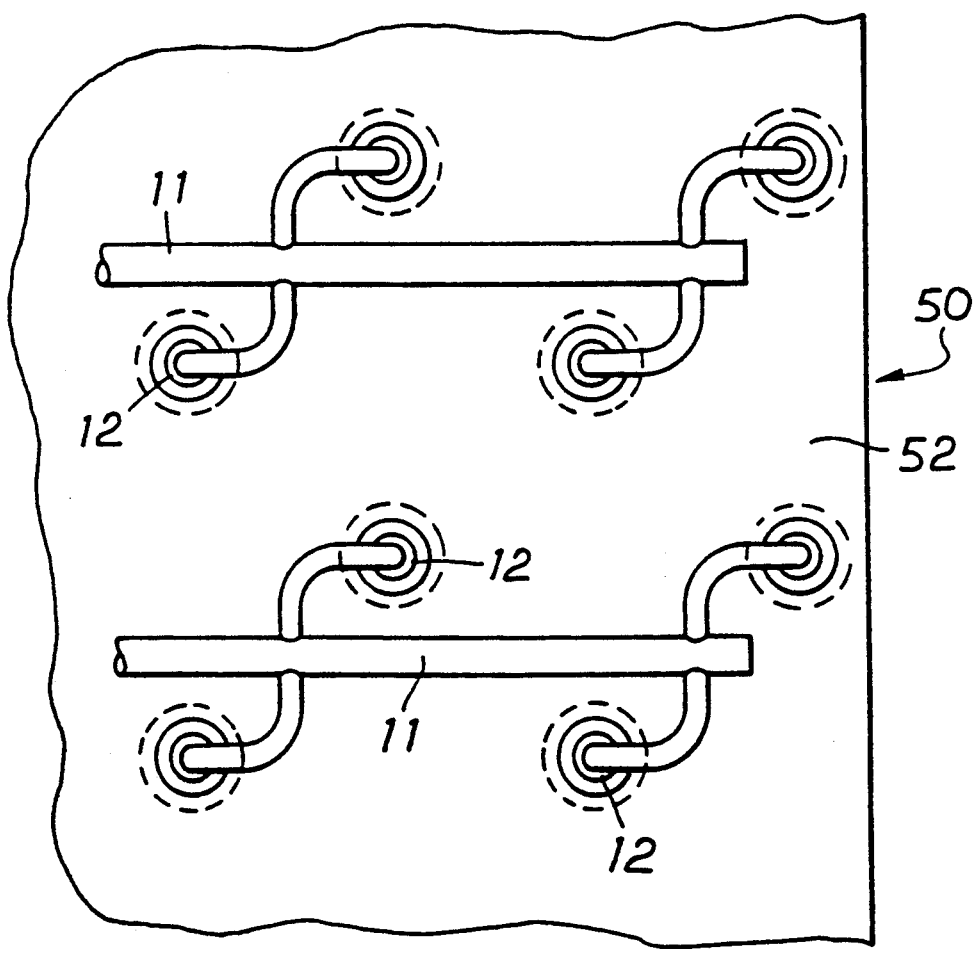

Embodiments of the present invention will now be described, by way of example only, with reference to the accompanying diagrammatic drawings, in which:

FIG. 1 shows partly in longitudinal section a part of a flexible carrier of a handling means in accordance with the present invention, FIGS. 2-4 show part of the operation of the handling means to transfer sheet material to the flexible carrier at a first work station, FIGS. 5-8 show stages in the transfer of sheet material from the first to a second work station, FIGS. 9-11 show details of carrier holding means operable at the second work station, FIGS. 12-14 show details of the assembly of tire bead formations at the second working station, FIG. 15 is a plan view of part of a flexible carrier of another handling means in accordance with the present invention, and FIGS. 16a and 16b respectively show side and plan views of a flexible carrier of handling means in accordance with a further aspect of the present invention.

One embodiment of handling means as used for part of the operation of manufacturing a reinforced tubular structure suitable for subsequent use in the manufacture of a pneumatic tire of the radial ply type is now described with reference to FIGS. 1-13 of the accompanying drawings.

A flexible carrier 15 for transportation of a ply of cord-reinforced flexible sheet material 9 between two work stations comprises a plurality of rigid hollow section slats 10 arranged in a parallel side-by-side relationship and interconnected by chains 13. The flexibility of the chains combined with the rigidity of the slats results in a flexible carrier which can be rolled upon itself about an axis perpendicular to the plane of FIG. 1 but which is substantially rigid to resist deformation about an axis extending across FIG. 1 in the plane thereof.

Each slat 10 houses a vacuum manifold which communicates with a plurality of vacuum suction cups 12 provided at a support surface of the carrier, being a lower surface of the carrier as shown in FIG. 1 in which the carrier is in an inverted condition.

The left-hand portion of FIG. 1 shows the carrier 15 in use to support a piece of flexible reinforced ply sheet material 9, the material being held securely to the carrier support surface by a vacuum acting through the cups 12.

The slatted carrier 15 is accurately located and supported by a carriage 16. One edge of the carriage is provided with ply clamp means 23 the function of which will be described below. The slats extend transversely relative to the length of the carrier.

As supported by the carriage 16, the slatted carrier 15 is movable in two mutually perpendicular directions X, Y (see FIGS. 5 and 6) between a first work station comprising mandrel 14 and a second work station comprising former 25.

In the direction X the carriage and carrier are movable in unison to and from the mandrel 14 by drive means not shown. In the direction Y the carrier is movable over the carriage to and from the former 25 also by drive means not shown. For this purpose the carriage is provided with guidance grooves 16a, 16b, 16c in which carrier support wheels (not shown) are located and guided.

The mandrel 14 is of a kind around which there has been formed, for example by helical winding, a layer of flexible elastomeric material having at least one helically extending reinforcing cord either wholly or partially embedded therein. The tubular layer of ply fabric is cut substantially parallel with the axis of rotation of the mandrel to provide a pair of cut edges 17, 18.

To transfer the ply fabric from the mandrel to the carrier 15 the carrier 15 and carriage 16 are moved in unison toward the mandrel 14 in the direction of arrow X. The positioning of the carrier relative to the mandrel in the direction Y is carefully controlled by position sensing and control means, not shown but of conventional type, prior to movement in the direction X thereby to ensure that when the carrier 15 comes toward the mandrel the carrier lies substantially centrally relative to the width of the ply fabric carried by the mandrel.

A final alignment operation ensures that the edges 21, 22 of the ply fabric are aligned precisely with the end edges 19, 20 of the carrier. This alignment operation utilises control arms 19a, 19b to move the slats sideways within the tolerance provided by the pin clearances in the carrier chains 13. (The control arms 19a and 20a, and the associated drive means 19b, 20b are positioned to lie within the central carriage groove 16b.) The leading edge 21 is first aligned precisely relative to the end edge 19 of the carrier and the carrier end edge 20 is then finely adjusted for accurate alignment with the ply fabric edge 22.

Having precisely aligned the respective edges 19, 20, 21, 22 of the fabric and carrier the clamp 23 is operated to grip the cut edge 18 of the ply fabric 9 and hold that edge on the carrier. Transfer of the ply fabric 9 from the mandrel to the carrier is then completed by rotating the mandrel 14 slowly, in a clockwise direction as viewed in FIGS. 2 and 3, concurrent with linear movement of the carriage as the latter returns from underneath the mandrel to the relative positioning shown in FIG. 2. If the ply fabric does not tend inherently to adhere to the mandrel 14, the mandrel may be provided with vacuum or like retention means to ensure proper support for the fabric as it is unwound onto the carrier. Vacuum is applied through the suction cups 12 to retain the ply fabric assembly positioned on the carrier.

Figure 5:
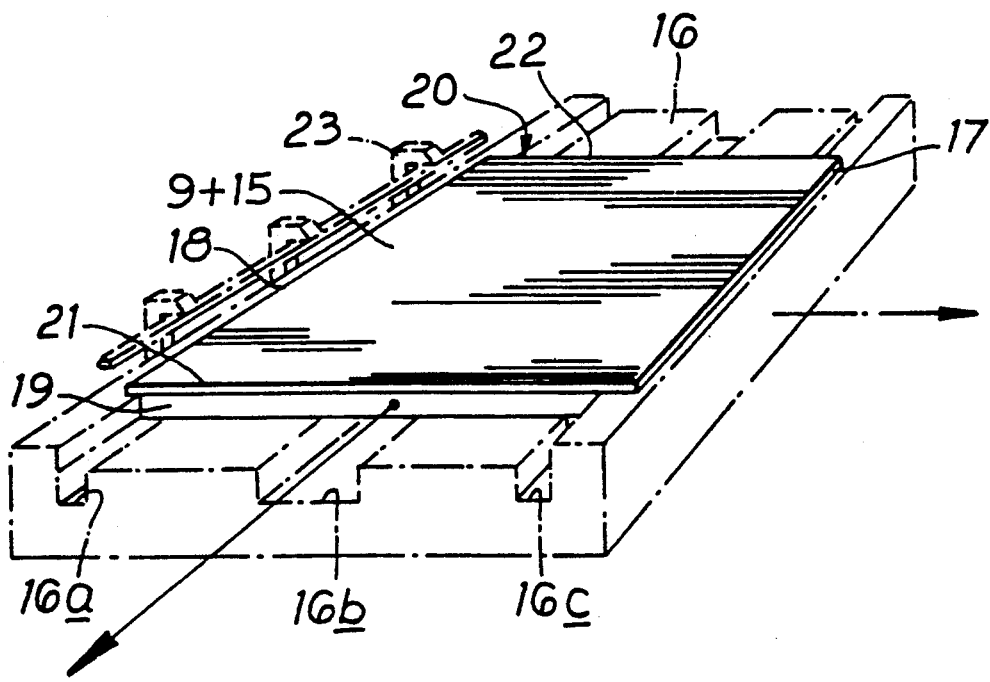

When the transfer is complete the ply is held firmly and positioned accurately on the carrier 15 in the manner shown in FIG. 5.

The carrier thus supports a sheet of ply fabric of a kind which as unwound from the mandrel comprises a reinforcement of a plurality of parallel cords.

From FIG. 5 it will be seen that in this embodiment of the invention the cut edges 17, 18 of the ply fabric overhang the ends of the slats. This arises because the circumferential length of the ply fabric 9 on the mandrel 14 is arranged to be greater than the slat length and the purpose of this will be described below.

Figure 6:
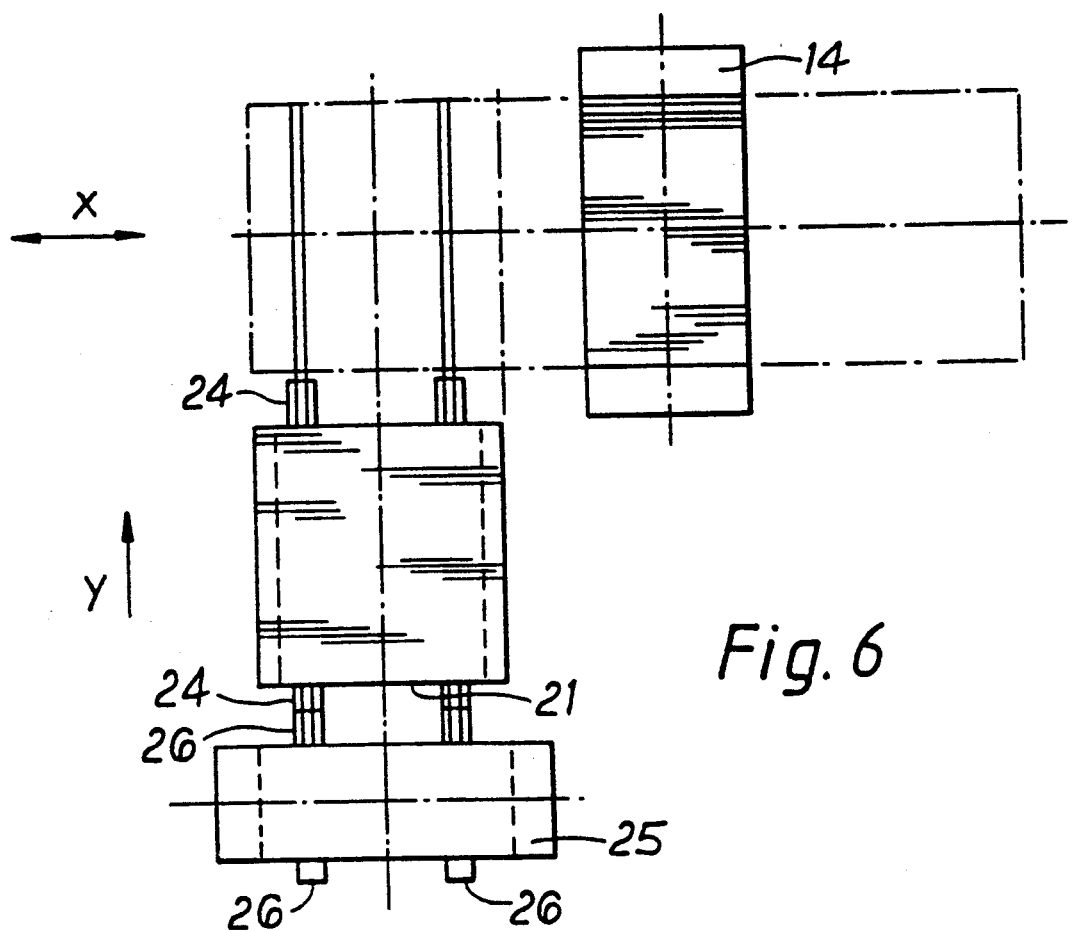

To continue the process of manufacture, the accurately positioned ply and carrier are transported along a carriage guide track 24 to a second work station where an already prepared building former 25 and carrier guide system 26, which aligns with the guide tracks 24, facilitates alignment and assembly of the ply onto the former 25 (see FIGS. 6 and 7). The former is of a cylindrical shape and the width of the ply fabric 9 when on the mandrel 14 is selected to correspond closely with the circumferential length of the former in this embodiment in which the material on the mandrel 14 is to be cut longitudinally. (If the material on the mandrel were to be cut transversely other than in the longitudinal direction, e.g. helically relative to the longitudinal axis of the mandrel, the length of that cut should correspond closely with the circumferential length of the former.)

The conveying direction Y to the former 25 results in the edge 21 of the ply fabric becoming the leading edge. The carrier moves into support by the guide system 26 to a prescribed position at which the now leading edge 21 is gripped and held by clamps 27 contained within the mechanism of guide system 26 (see FIG. 7).

An upper portion of guide system 26 extends through a semi-circular path thereby to position edge 21 such that it can be manipulated to form an invisible joint when the trailing edge 22 of the ply fabric is brought upwards and round, supported on the carrier, to complete encirclement of the former as shown in FIG. 8.

Joining of the ends 19, 20 of the carrier will now be described with reference to FIGS. 9 and 10. As the clamps 27 draw the leading edge 21 of the carrier to the position shown in FIG. 8 a holding finger 28 extends axially between the former 25 and the guide system. The finger 28 is then moved radially outwards to contact and support the exposed face of the ply end 21 which is held and supported by the leading end 19 of carrier 15. The finger 28 may incorporate a vacuum facility for retention of ply fabric and or a pressure facility to cause ply fabric to lift from the finger. In FIG. 9 the end 19 is shown as part of end slat 29 and end 20 as part of slat 30. The vacuum holding action of these slats can be separately controlled so that when finger 28 has hold of ply edge 21 the holding action of slat 29 can be released and slat 29 rotated in a direction so as to expose the ply edge 21.

In FIGS. 8 and 9 the guide track closing mechanism 31 is shown lifting end slat 30 in an involute path so as to cause end 20 to contact guiding face 32 of slat 29 which is exposed and positioned when slat 29 is rotated. The end 20 can then be guided, in one continuous motion, by face 32 to move the ply edge 22 into, for example, an overlapping contact with the exposed edge 21 and apply a joining force which is resisted by the finger 28. The joint is then completed with mechanism lying as shown in FIG. 10.

Preferably end slat 30 is also rotated to expose the completed joint so that a consolidating roller (not shown) can traverse the joint to ensure that it is firmly held together over its entire length.

The joining process is completed by the slat 30 being returned to contact and hold the joint while latches 33 (see FIG. 11) are operated to cause the carrier to become a continuous hoop. The finger 28 is then removed so that former 25 can expand radially and cause components which have been preapplied to the former to contact the ply.

The carrier is then in a condition to provide the means of positioning reinforcing hoops such as tire beads. If conventionally produced tire beads and apexes are employed these may be fitted and held to the ends of the now continuous support tube formed by the carrier before the former is expanded against the inside of the support tube. By virtue of the aforedescribed feature of the cut edges 17, 18 of the ply fabric overhanging the ends of the slats the overhanging ends can be turned radially outwards around the beads, thereby to assist in locating the beads and resisting their subsequent axial separation.

FIG. 12 illustrates another method of providing and positioning the beads. Each bead 36 and apex 37 can be wound against a respective edge of the continuous support tube after the former has expanded. In this process the slats are fitted with special brackets 34 to create a supporting face 35 against which the bead 36 and apex 37, or bead and apex assembly, can be wound.

FIG. 13 illustrates the benefit gained during the turning up operation by leaving the carrier with brackets 34 in situ so that the length of reinforcing cords of the ply which is locked around the beads is precisely defined and the brackets 34 provide an anvil against which the ply turn-up can be consolidated.

When the consolidation has been completed the use of the carrier is virtually complete if, in the case of tire manufacture, the type of former in use is one which is capable of providing the means of inflating the tubular carcass structure into its final toroidal form. The carrier can then be removed to perform another cycle of operation. If however the former used does not have the means to inflate the carcass in the case of tire manufacture the carrier can perform yet another function by holding the carcass in its now tubular form while the former is exchanged for one which can perform the inflation operation before the carrier is removed from the outer surface of the carcass.

FIG. 14 illustrates a yet further method for providing and positioning the beads. The bracket 39 has an inclined surface 38 whereby a circumferentially extending series of the brackets define a frusto-conical surface against which an inwardly inclined bead apex region 40 may be formed. The flexibility of the apex in the finished assembly allows removal of the carrier.

FIG. 15 illustrates another form of the carrier described as a chain mat and comprising a staggered array of blocks 40 interconnected by chain links 41. This form of carrier is most useful for handling reinforced components which have a parallelogram shape such as used in cross-ply tires or suspension units or breaker plies of radial tires. The carrier can be used substantially in the same manner as described for the aforedescribed slatted version. It can also be contorted in an angular plane so that the vacuum pick-off and application processes can be achieved in a circular path different from the angle of any reinforcing cords contained in the supported sheet material. FIG. 16 illustrates yet another form of the carrier 50 which has instead of or in addition to its proprietory vacuum cups 51 a vacuum support system which covers an area extending to the shape of the sheet material component to be carried by the carrier. This form of carrier can use, for example, reticulated flexible foamed plastics material 52 in contrast to the aforedescribed slats or blocks and can be used to provide support for sheet material over the whole of its surface. It is therefore well suited for use with elastomeric components which do not contain reinforcement.

Although the aforesdescribed operation of manufacturing a reinforced tubular structure is suitable for the construction of a tubular structure deformable to the toroidal shape of a pneumatic tire and especially one of the radial ply type it is to be understood that the tubular structure may be used as, or for the subsequent formation of, other articles such as a suspension diaphragm. Furthermore it is not limited to the accurate transfer and location of sheet material of the reinforced type; it is likewise applicable to the handling of sheets of unreinforced material.

I claim:

1. Handling means for the transportation of flexible sheet material between a first and second work station comprising:

a first work station, a flexible carrier for receiving flexible sheet material at the first work station, a second work station for receiving flexible sheet material from the flexible carrier, said flexible carrier being flexible about one axis contained by the plane of the carrier whereby it may be flexed to adopt a tubular shape at said second work station, said one axis being an axis which extends in a direction substantially parallel with the direction in which material is received by the carrier at the first work station but said carrier being substantially rigid about a second axis contained by said plane and extending in a direction substantially perpendicular relative to said one axis and the carrier incorporating retention means movable in unison with the carrier, said retention means being selectively operable to secure flexible sheet material to the carrier and accurately maintain a prescribed positioning of the sheet material relative to the carrier during movement of the carrier between the first and second work stations and during and subsequent to said flexing of said carrier to said tubular shape at the second work station, drive means operable to move the carrier between the first and second work stations, first alignment means to facilitate accurate location of flexible sheet material in a prescribed position on the carrier at the first work station, and second alignment means to facilitate accurate location of sheet material relative to the second work station during transfer of the sheet material from the flexible carrier at the second work station.

2. Handling means as claimed in claim 1, wherein carrier guide means is provided to guide the carrier during movement thereof by the drive means between said first and second work stations whereby the direction relative to the carrier in which sheet material is received by the carrier from the first work station is substantially perpendicular to the direction relative to the carrier in which sheet material is transferred from the carrier to the second work station.

3. Handling means as claimed in claim 1, wherein the flexible carrier comprises a plurality of substantially rigid slats arranged in a side-by-side manner and interconnected by flexible connecting means whereby the flexible carrier, when arranged in a planar form, is flexible about said one axis and substantially rigid about said second axis.

4. Handling means as claimed in claim 3, wherein said flexible connecting means is comprised by at least one chain.

5. Handling means as claimed in claim 4, wherein said retention means is a vacuum retention means.

6. Handling means as claimed in claim 5, wherein at least one of said plurality of slats is provided with a vacuum manifold which communicates with a plurality of suction zones in that surface of the slat for support of flexible sheet material.

7. Handling means as claimed in claim 3, wherein at least one of the slats comprises a pressure manifold for supply of pressurised fluid to at least one opening in that surface of the slat for support of flexible sheet material whereby a supply of pressurized fluid to said pressure manifold will urge flexible sheet material away from the support surface of the slat.

8. Handling means as claimed in claim 7, wherein at least one of the two end slats of the flexible carrier lying at respective ends of the carrier as considered in the direction of the length of said second axis comprises said pressure manifold.

9. Handling means as claimed in claim 3, wherein at least one of the two end slats lying at a respective ends of the carrier as considered in the direction of the length of said second axis is individually rotatable relative to slats lying intermediate said end slats thereby to facilitate interconnection of the end slats one with the other when the carrier is flexed to said tubular shape at said second work station.

10. Handling means as claimed in claim 3, wherein neighbouring slats may be moved towards or away from one another.

11. Handling means as claimed in claim 1, wherein the carrier comprises an interlinked array of support blocks the interconnecting links of which are arranged to facilitate flexing of the carrier to a substantially cylindrical or tubular form in which two end portions of the carrier are brought into proximity one with the other.

12. Handling means as claimed in claim 1, wherein the carrier comprises an interlinked array of support blocks the interconnecting links of which are arranged to facilitate flexing of the carrier in a helical manner to a scroll form.

13. Handling means as claimed in claim 11, wherein the flexible carrier possesses the shape of a parallelogram.

14. Handling means as claimed in claim 1, wherein the carrier comprises a sheet of pliable material for support of said flexible sheet material.

15. Handling means as claimed in claim 1, wherein the retention means is a vacuum retention means.

16. Handling means as claimed in claim 1, wherein the retention means is a magnetic retention means.

17. Handling means as claimed in claim 1, wherein the flexible carrier is provided at at least one edge region with edge support means adapted to support material applied to the flexible carrier when, in use, the carrier is deformed to said tubular shape at said second work station.

18. Handling means as claimed in claim 17, wherein said edge support means comprises a support face which extends substantially perpendicular to the support surface of the flexible carrier.

19. Handling means as claimed in claim 1, wherein the flexible carrier comprises connecting means which confer a varying extensibility to different regions of the carrier.

20. Handling means as claimed in claim 1, wherein said first work station is a building station having means for constructing a tubular component of flexible material and for cutting the component transversely to provide said component with a pair of cut edges.

21. Handling means as claimed in claim 20, wherein guide means is provided to guide the flexible carrier between the building station and a second work station whereby the direction relative to the flexible carrier in which sheet material is transferred from the carrier to the second work station is substantially parallel with the length of a cut edge of sheet material when supported by the carrier.

22. Handling means as claimed in claim 1, wherein said second work station is a building station at which flexible sheet material from said flexible carrier may be guided around an expansible building former.

23. Handling means as claimed in claim 2, wherein the carrier is slidable on a carriage in a direction with that of said second axis about which the carrier is rigid.

* * * * *